United States Patent [19]

Nonomura et al.

[11] 4,385,292
[45] May 24, 1983

[54] SEGMENTED TYPE LIQUID CRYSTAL DISPLAY AND DRIVING METHOD THEREOF

[75] Inventors: Keisaku Nonomura, Nara; Masataka Matsuura, Tenri; Hisashi Uede, Wakayama; Kohhei Kishi, Nara; Hiroaki Kato, Tenri, all of Japan

[73] Assignee: Sharp Kabushiki Kaisha, Osaka, Japan

[21] Appl. No.: 172,175

[22] Filed: Jul. 25, 1980

[30] Foreign Application Priority Data

Jul. 30, 1979 [JP] Japan .................................. 54-97912
Jul. 31, 1979 [JP] Japan .................................. 54-98367
Jul. 31, 1979 [JP] Japan .................................. 54-98369

[51] Int. Cl.³ ............................................. G09G 3/36
[52] U.S. Cl. .................................... 340/719; 340/765; 340/784; 350/333
[58] Field of Search ............... 340/718, 719, 765, 784; 350/332, 333, 330

[56] References Cited

U.S. PATENT DOCUMENTS

| | | | |
|---|---|---|---|
| 3,668,688 | 6/1972 | Schmersal | 340/718 |
| 3,862,360 | 1/1975 | Dill et al. | 340/719 |
| 4,142,182 | 2/1979 | Kmetz | 350/332 |
| 4,239,346 | 12/1980 | Lloyd | 340/719 |
| 4,245,168 | 1/1981 | Waldron | 350/332 |

*Primary Examiner*—Marshall M. Curtis
*Attorney, Agent, or Firm*—Birch, Stewart, Kolasch & Birch

[57] ABSTRACT

A system is disclosed for driving a segmented type liquid crystal display comprising a thin film transistor (TFT) array including a plurality of TFTs each having a gate line, a source line, and a drain line, a pair of substrates with one carrying the thin film transistor array coupled to a plurality of segmented display electrodes and the other carrying a common electrode opposite to the segmented display electrodes, a liquid crystal material interposed between the pair of substrates. The system is characterized by a source line and drain line driving circuit for driving the source line and the drain line with a first voltage waveform and a second voltage waveform in such a manner that the ratio of the first voltage amplitude to the second voltage is so selected that both charging and discharging voltages in the forward and backward directions are zero when the TFTs are off.

In another aspect of the segmented type display of the present invention, there is additionally provided a separating element for separating the thin film transistor array from the liquid crystal material. In a further aspect, the plurality of pairs of the segmented display electrodes and the common electrodes are allotted equally to each of the pair of substrates.

5 Claims, 30 Drawing Figures

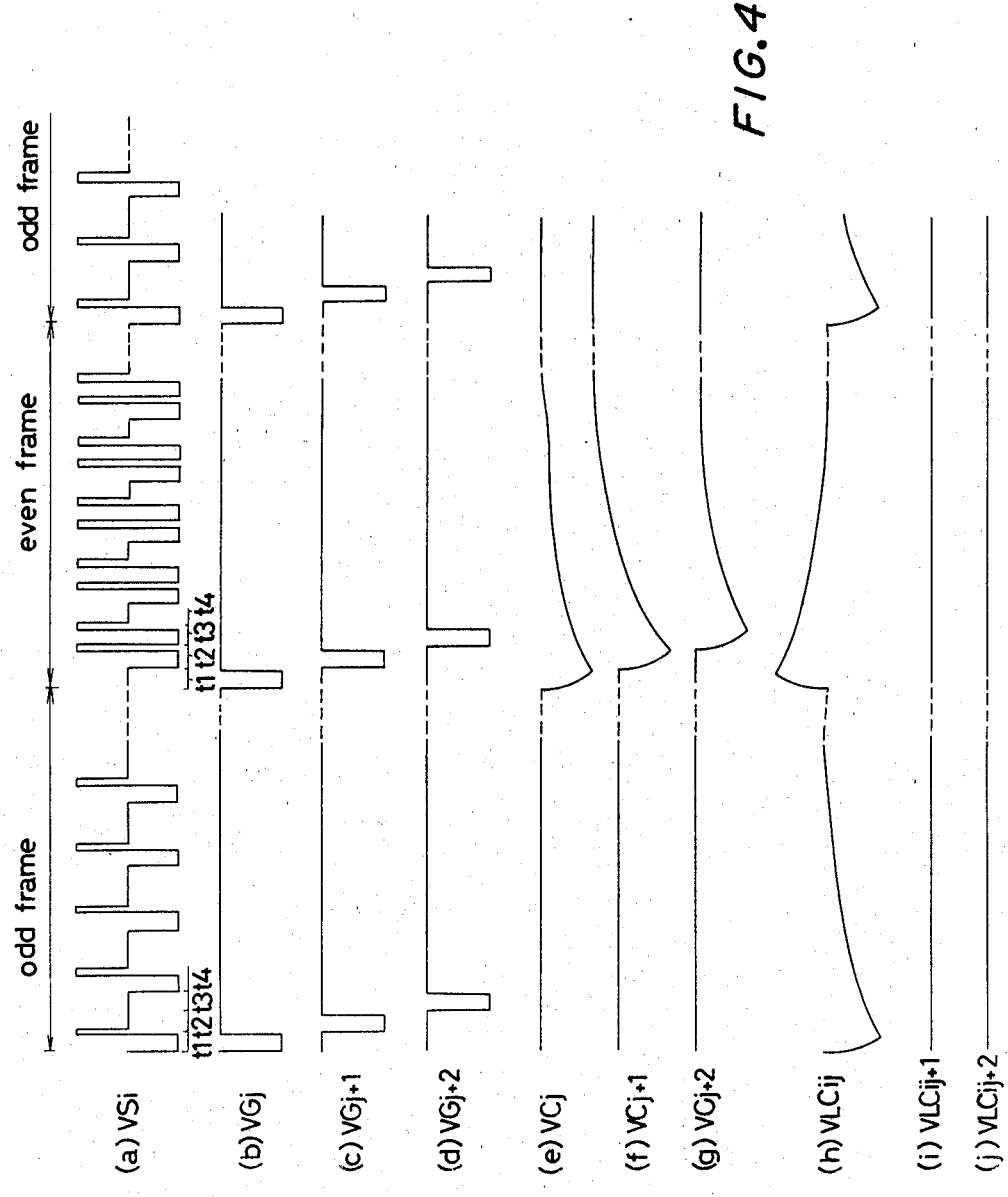

SEGMENTED TYPE LIQUID CRYSTAL DISPLAY AND DRIVING METHOD THEREOF

BACKGROUND OF THE INVENTION

The present invention relates to a liquid crystal display and it driving method and, more particularly, to a structure of a segmented type liquid crystal display and its driving method using a circuit implemented with thin film transistors (referred to as "TFT" hereinafter).

In connection with a circuit using TFTs, although related to a matrix type liquid crystal display unlike a segmented type liquid crystal display for use with the present invention, a copending Patent Application was filed by K. Nonomura et al. in the U.S.A., assigned to the present assignee. This patent application was filed on Feb. 7, 1979, and assigned Ser. No. 10,322.

The British counterpart was filed on Feb. 7, 1979 and assigned Patent Application No. 7904352. The West German counterpart was filed on Feb. 7, 1979 and assigned Ser. No. P 29 04 596.3.

The segmented type liquid crystal display for use in the present invention is different from the matrix type liquid crystal display. Differently from the former, the latter required that TFTs be positioned near to corresponding ones of the picture elements of the matrix in order to enable a smaller and integrated TFT structure.

In this respect it was desired that a specific circuit adapted for driving the segmented type liquid crystal display be modified for this purpose.

SUMMARY OF THE INVENTION

Accordingly, it is an object of the present invention to provide an improved liquid crystal display of the segmented type using TFTs.

It is another object of the present invention to provide an improved segmented type liquid crystal driving circuit implemented with TFTs.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a system is disclosed for driving a segmented type liquid crystal display comprising a thin film transistor (TFT) array including a plurality of TFTs each having a gate line, a source line, and a drain line, a pair of substrates with one carrying the thin film transistor array coupled to a plurality of segmented display electrodes and the other carrying a common electrode opposite the segmented display electrodes, a liquid crystal material interposed between the pair of substrates. The system is characterized by a source and drain line driving circuit for driving the source line and the drain line with a first voltage waveform and a second voltage waveform in such a manner that the ratio of the first voltage amplitude to the second voltage is so selected that both charging and discharging voltages in the forward and backward directions are equal to zero when the TFTs are off.

In another aspect of the segmented type display of the present invention, there is additionally provided a separating element for separating the thin film transistor array from the liquid crystal material. In a further aspect, the plurality of pairs of the segmented display electrodes and the common electrodes are allotted equally to each of the pair of substrates.

BRIEF DESCRIPTION OF THE DRAWINGS

The present invention will become more fully understood from the detailed description given hereinbelow and accompanying drawings which are given by way of illustration only, and thus are not limitative of the present invention and wherein.

DESCRIPTION OF THE INVENTION

A segmented type liquid crystal display for use with the present invention differs from a conventional matrix type liquid crystal display. The conventional matrix type liquid crystal display is disclosed in the above-referenced U.S. patent application Ser. No. 10,322, the disclosure of which is incorporated herein by reference.

More particularly, the segmented type liquid crystal display does not require that TFTs be positioned adjacent a plurality of segments, with the result that a TFT array can be formed apart from the location of the segments and as large as possible in such an extent that the distance between a source electrode and a drain electrode is in the order of about 100 μm to about 1 mm, for example.

In addition, there is a considerable area for a parasitic capacitor, adjacent the segments. The size of the parasitic capacitor is independent of the scale of the segments. Preferably, the capacitance of the parasitic capacitor is as large as possible.

The conventional matrix type liquid crystal display required that TFT, the parasitic capacitor, and an X-Y bar electrode be all integrated into a considerably small area. It was further desired that the area occupied by each of the TFTs be smaller than that occupied by each picture element. Therefore, an accurate technique for fine pattern formation was needed for producing the TFTs in a fine pattern having resolution less than about 10 μm.

Although it was preferred that the parasitic capacitor be as large as possible, it was very difficult to do so because the effective area for the parasitic capacitor was limited to smaller than that of the picture element, and a reduced thickness of an insulating film was difficult due to possible pin holes.

Figure 1:
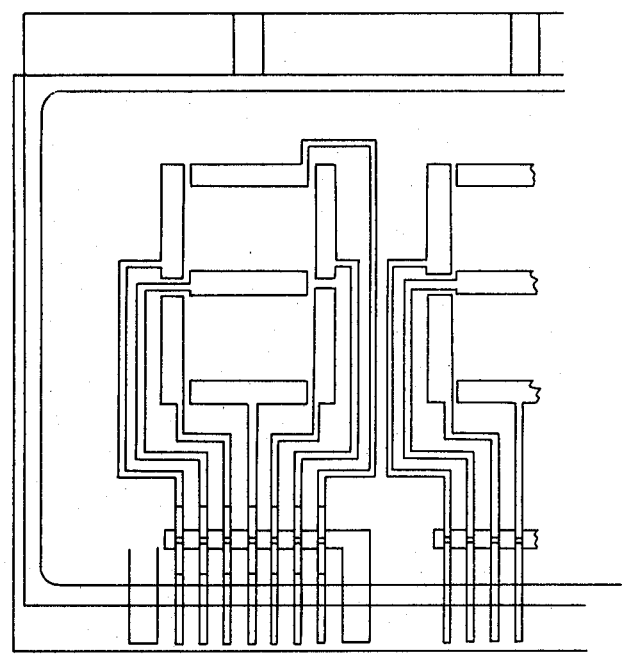
FIG. 1 shows a plan view of a segmented type liquid crystal display according to the present invention.
Figure 2A:
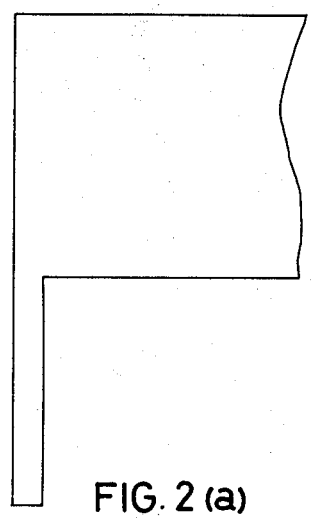
FIGS. 2(a) to 2(f) show a mask pattern used for forming the display of FIG. 1.
Figure 2B:
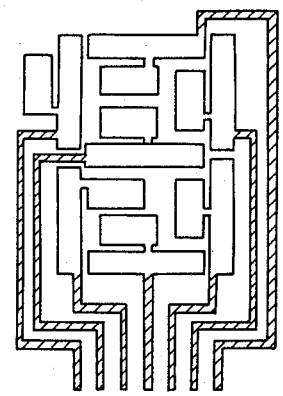
Figure 2C:
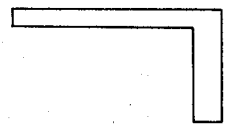
Figure 2D:
Figure 2E:
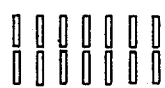
Figure 2F:
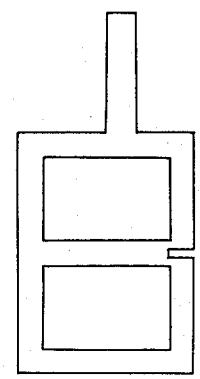
Figure 3A:
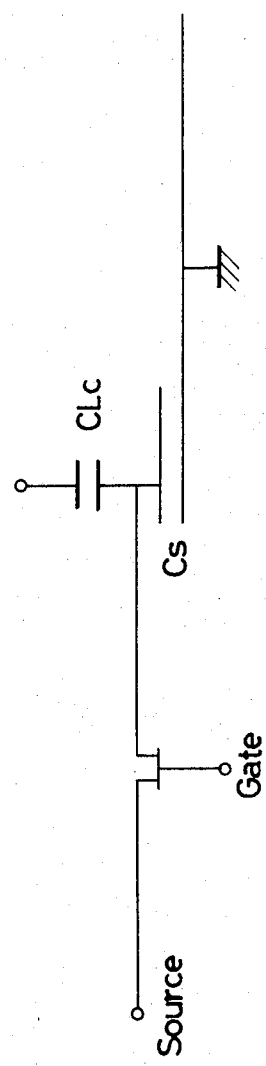
FIGS. 3(a) and 3(b) show an equivalent circuit diagram of the display of FIG. 1 and a cross-sectional view of the same, respectively.
Figure 3B:
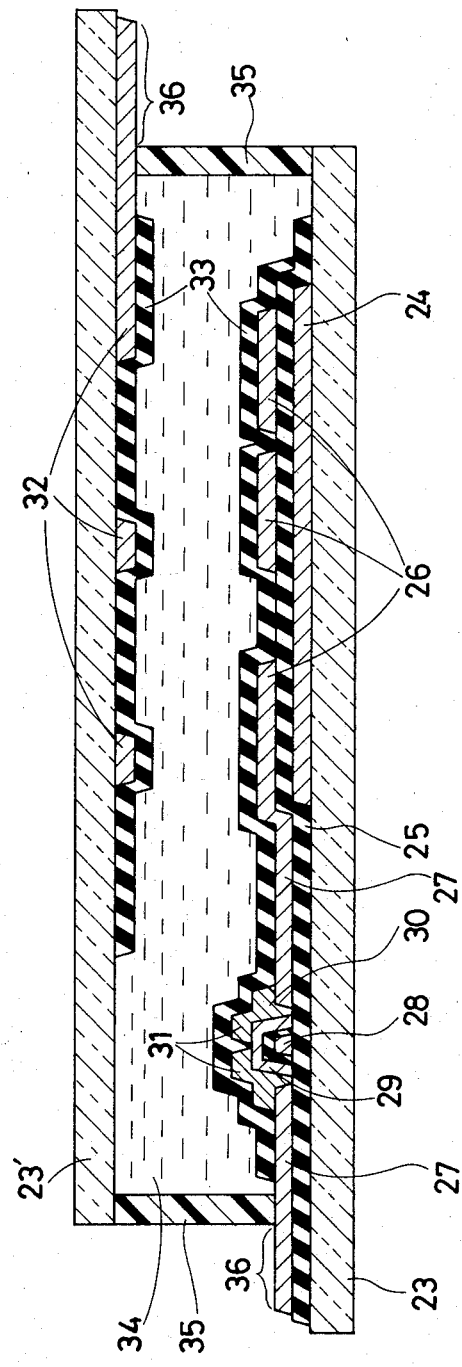

FIG. 1 shows a plan view of the segmented type liquid crystal display according to the present invention. FIGS. 2(a) to 2(f) denote a mask patten used for forming the segmented type liquid crystal display in the following steps. FIGS. 3(a) and 3(b) show an equivalent circuit diagram and a cross-sectional view of the segmented type liquid crystal display fabricated using the mask pattern as shown in FIGS. 2(a) to 2(f) by evaporation or etching techniques as follows Step 1: On a substrate 23 in FIG. 3(b), preferably, made of glass or the like, a transparent electrode, preferably, made of $In_2O_3$ or the like is formed using the mask pattern shown in FIG. 2(a). The transparent electrode provides 24 of FIG. 3(b), functioning as one of a pair of electrodes for a parasitic capacitor Cs.

Step 2: An insulating film, denoted as 25 in FIG. 3(b), is formed on the entire surface over the substrate 23 and the transparent electrode 24. The material of the insulating film 25 may be $SiO_2$ or the like provided by Chemical Vapor Deposition (CVD) or the like. The insulating film 25 functions as a dielectric film for the parasitic capacitor Cs and a substrate film on which TFTs are fabricated.

Step 3: Using the mask pattern indicated in FIG. 2(b), another transparent electrode is formed, preferably, made in $In_2O_3$ or the like. This transparent electrode provides the other of the pair of electrodes for the parasitic capacitor, a segment electrode 26, and a connecting electrode 27 coupling the segments and TFTs.

Step 4: Using the mask pattern shown in FIG. 2(c), an electrode is formed, preferably, made of Al or the like. This electrode provides a gate electrode 28 of TFTs.

Step 5: On the gate electrode 28, an insulating film is further deposited. This insulating film provides a film 29 of TFTs. It is produced by evaporation or an anodic oxidation method.

Step 6: By the mask pattern of FIG. 2(d), a semiconductor layer designated by 30 is formed, preferably, made of CdS, CdSe, Te or the like.

Step 7: By the mask pattern indicated in FIG. 2(e), a source and a drain electrodes each denoted as 31 are deposited. They are coupled to the transparent connecting electrode 27. Preferably, the material of the source and the drain electrodes is selected from Au, Ni, Co, In or the like.

Step 8: On a substrate 23' opposing to the substrate 23, using the mask pattern of FIG. 2(f), a further transparent electrode is formed. Preferably, the substrate 23' is made of glass or the like. This transparent electrode is preferably made of $In_2O_3$ or the like. This transparent electrode provides a common electrode 32 confronting all of the segment electrodes.

Step 9: A further insulating film is deposited over all the films and the two substrates 23 and 23' except for two terminal connecting portions 36 thereon. Preferably, this insulating film is composed of SiO, $SiO_2$, $Al_2O_3$, or the like. This insulating film provides a film designated by 33. The insulating film 33 functions as a protecting film for the TFTs, segment electrodes, and the common electrode. In addition, it operates as a substrate film on which a TN-FEM liquid crystal material 34 is disposed and oriented.

Step 10: Applying the rubbing method or oblique evaporation method to the two substrates 23 and 23' accomplishes a desired TN orientation. A sealing element 35 is used for bonding the two substrates 23 and 23' with each other. Thereafter, the TN-FEM liquid crystal material 34 is introduced into a cavity defined by the two substrates 23 and 23'.

Referring now to FIG. 3(a), the equivalent circuit of the segmented type liquid crystal display comprises one TFT including a source, a gate, and a drain, the parasitic capacitor Cs, and a capacitor CLC of the liquid crystal material. The parasitic capacitor Cs causes increment of the capacitor by the segments.

Figure 4:
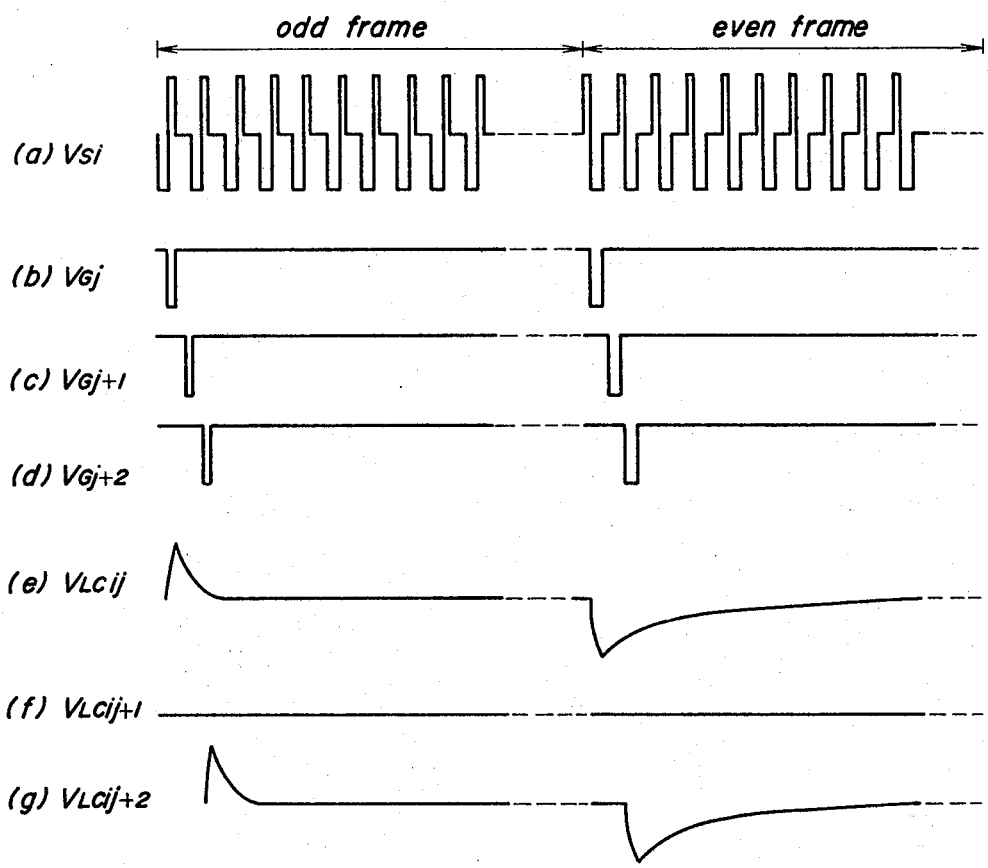
FIGS. 4(A), 4(B) and 4(C) are timing charts of a method of enabling the display of FIG. 1.
FIGS. 4(D) and 4(E) are a circuit diagram and a timing chart of an exemplary circuit for producing a source voltage.
FIGS. 4(F) and 4(G) are a circuit diagram and a timing chart of an exemplary circuit for producing voltages $V_{cj}$ to $V_{cj+2}$.
Figure 4:
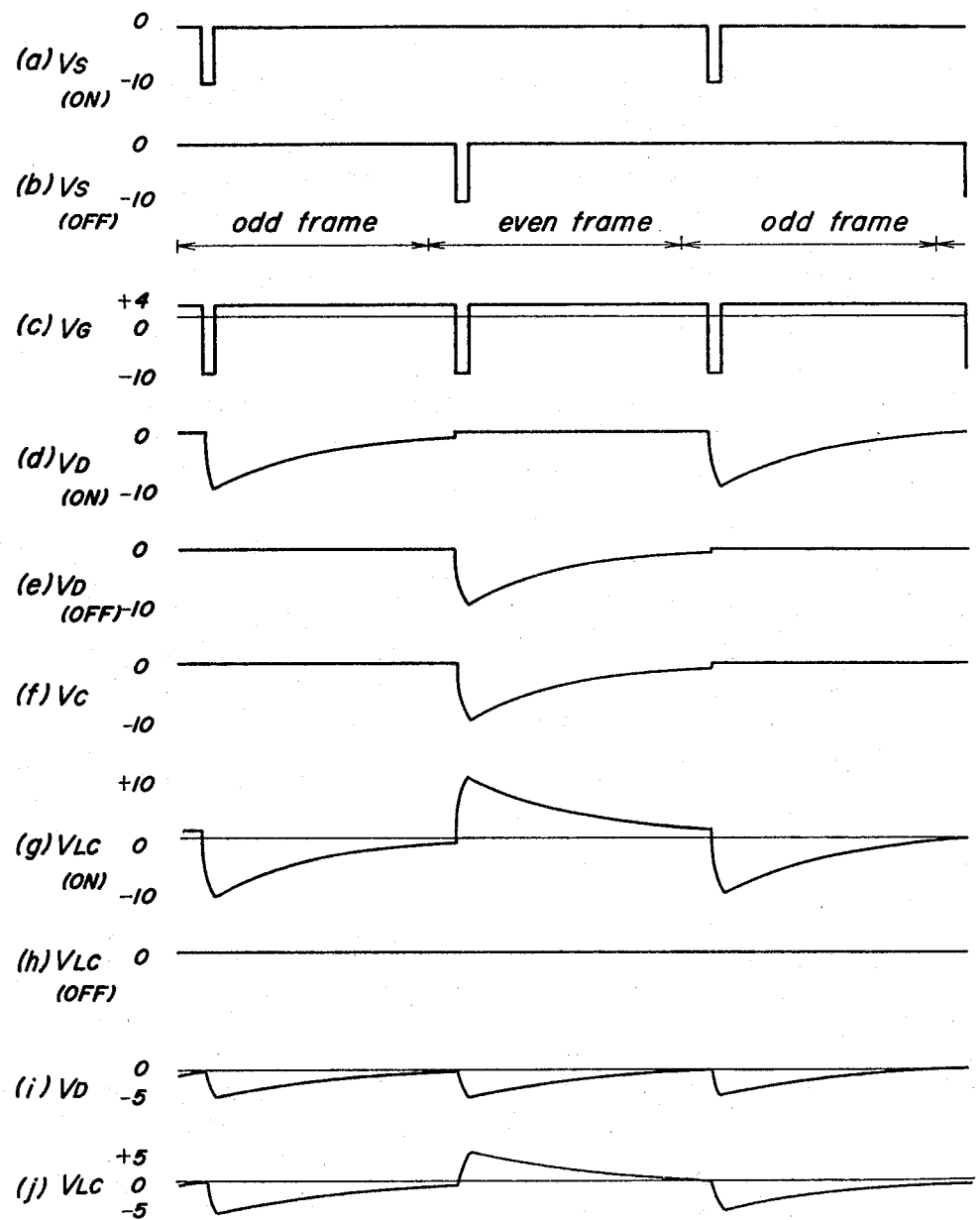

FIGS. 4(A), 4(B) and 4(C) are timing charts of a method of driving the segmented type liquid crystal display as shown in FIGS. 3(a) and 3(b) in accordance with the present invention.

The method represented in FIGS. 4(A), 4(B), and 4(C) is intended to function as follows:

1. Elimination of an objectionable visual display or difference in contrast corresponding to the number of the liquid crystal picture elements enabled at a particular moment is accomplished.
2. To supply the liquid crystal material with a voltage where a d.c. component which would shorten the life of the liquid crystal panel is prevented.

To achieve the first purpose, the segmented type liquid crystal display panel of the present invention is driven in accordance with the timing chart of FIG. 4(A).

FIG. 4(A)-(a) shows waveform of the source voltage $V_{si}$ which is applied to the (i)th source electrode and has positive and negative polarity components. A pulse width ratio of the positive to negative polarity components is selected such that charging and discharging are effected in the positive and negative directions to reduce an effective voltage value to zero, when the TFT is in the OFF state, in order to compensate for variations in the characteristics with respect to the positive and negative polarities. FIG. 4(A)-(b) illustrates waveform of the voltage at the source electrode when the picture elements on the (i)th source electrode are subject to the write operation and non-write operation alternatively with respect to each other. It will be noted that the positive and negative pulses of the source voltage are reversed in phase between the odd and even frames.

FIG. 4(A)-(b) to 4(A)-(d) illustrate waveforms of the gate voltages $V_{Gj}$, $V_{Gj+1}$ and $V_{Gj+2}$ at a (j)th gate electrode through the (j+2)th gate electrode which are to be scanned in sequence. In the case where the positive pulse of the gate voltage is applied to the liquid crystal material in conformity with the pulse width of the source voltage, there is applied the gate pulse of the same pulse width as that of the negative pulse of the source voltage. It will be noted that the positive and negative pulses are applied during the odd and even frames, respectively.

Accordingly, the source voltage $V_{si}$ is applied when it is desired to write intelligence signals onto the electrodes sequentially supplied with the gate pulses as seen from FIG. 4(A)-(b) to 4(A)-(d). The respective electrodes are held at the zero potential when it is not desired to write. In the example as shown in FIG. 4(A), the (i, j)th and (i, j+2)th picture elements are written whereas the (i, j+1)th picture element is not written. The source voltage $V_{si}$ at the (i)th is the voltage waveform which defines the write interval and the non-write interval with respect to the (i)th column picture elements.

The display operation is executed on the liquid crystal material in such a way that the respective ones of the picture elements selected by the source voltage and the gate pulse are supplied with the voltage which alternates in polarity at every field as seen from FIG. 4(A)-(e) to 4(A)-(g).

As stated above, according to the present invention, the source voltage is bipolar including the positive and negative components and of the varying pulse width to reduce the charging and discharging voltages to zero in the opposing directions when the TFT is off. Even if only one picture element is not to be written on, this non-write picture element would not be supplied with voltage because of cross-talk. Thus, the non-write picture element will not be energized. The display panel of the present invention enjoys a higher contrast and avoids any substantial difference in coloration in proportion to the number of the picture elements to be written.

The findings of the inventors' experiments demonstrated that the following pulse width ratios were suitable when the TFT comprised tellurium as semiconductor material:

$$\frac{\text{pulse width of positive pulse}}{\text{pulse width of negative pulse}} = 0.2\text{-}0.05$$

To achieve the second purpose, the segmented type liquid crystal display panel of the present invention is driven in accordance with the timing chart of FIG. 4(B).

When it is desired to write a selected one of picture elements, the unidirectional source voltage pulse $V_s$ as shown in FIG. 4(B)-(a) is supplied to the source electrode of its associated TFT. The source voltage pulse is a negative one in the case where the TFTs are made of Te and a positive one in the case where they are made of CdS or CdSe. The gate voltage pulse $V_G$ as seen from FIG. 4(B)-(a) and 4(B)-(c) is applied in such a way that the TFT is off during the odd frames and on during the even frames. Since the TFTs are turned on during the odd frames and turned off during the even frames as seen from FIG. 4(B)-(a) and 4(B)-(c), the drain voltage $V_D$ (ON) of the TFTs will be in the waveform of FIG. 4(B)-(d). The waveform of FIG. 4(B)-(d) illustrates only the negative voltage side and, of course, includes a d.c. component. Pursuant to the teachings of the present invention, the common voltage $V_c$ with the opposite polarity as seen from FIG. 4(B)-(f) is supplied from the common electrode during the even frames. As a result, a differential voltage between the voltages of FIG. 4(B)-(d) and 4(B)-(f), namely, the voltage waveform of FIG. 4(B)-(g) is applied across the liquid crystal material to perform the write operation. It is concluded from FIG. 4(B)-(g) that a voltage value and a waveform of the common voltage $V_c$ may be properly selected in line with the drain voltage $V_D$ for supply of an alternating voltage including no d.c. component to the liquid crystal panel.

When a selected picture element of the liquid crystal material is not desired to be written, the source electrode of its associated TFT is supplied with the source voltage $V_s$ (OFF) as seen from FIG. 4(B)-(b) together with the gate voltage pulse $V_G$ of FIG. 4(B)-(c) in the way that the TFT selecting that picture element is turned off during the odd frames and off during the even frames. Therefore, the drain voltage $V_D$ (OFF) of the TFT is in the waveform as in FIG. 4(B)-(e) and supplied to one electrode of the picture element of the liquid crystal material. The common voltage $V_c$ as seen from FIG. 4(B)-(f) is supplied from the common electrode during the odd frames with the resulting similarity in voltage polarity and waveform. Therefore, no potential difference stands between the two opposing electrodes of the panel with the drain voltage $V_D$ (OFF) as indicated in FIG. 4(B)-(h).

If it is desired to provide a half-tone display, the amplitude of the source voltage $V_s$ and the common voltage should be varied in accordance with degree of writing. The drain voltage and the applied voltage across the liquid crystal material are illustrated in FIG. 4(B)-(i) and 4(B)-(j).

As stated earlier, according to two examples of the present invention, the specific point in time where the TFT is turned on or off differs between the odd and even frames. At the same moment the voltage is so applied either from the TFT or from the common electrode as to supply a selected one of the picture elements on the display panel with the write voltage or to reduce the write voltage to zero. Accordingly, the TFTs are responsive to only good property unidirectional pulses and achieves highly efficient enabling so that the panel is enabled with alternating voltage including no d.c. component to enjoy a relatively longer life.

One effective way to obtain both the first and second purposes according to the present invention will be described below with reference to the timing chart of FIG. 4(C).

FIG. 4(C)-(a) shows waveform of the source voltage on the (i)th column whereby the respective picture elements are enabled repeatedly in a sequence of a write operation, the non-write operation and a non-write operation. The negative and positive pulses are applied during the period from $t_1$ up to $t_2$ and the zero voltage during the periods from $t_2$ to $t_3$ and from $t_3$ to $t_4$.

In order that the TFTs are turned on, off and off during the period from $t_1$ to $t_4$ within the odd frames and turned off, on, and on during the period from $t'_1$ to $t'_4$ within the even frames, the source voltage is designed together with the gate voltage such that the zero voltage stands from $t'_1$ to $t'_2$ and the negative and positive pulses are applied from $t'_2$ to $t'_3$ and the negative and positive pulses are applied from $t'_3$ to $t'_4$.

A pulse width ratio of the negative to the positive pulse is established as illustrated with respect to FIG. 4(A). FIG. 4(C)-(b) depicts waveform of the gate voltage on the (j)th line, FIG. 4(C)-(c) on the (j+1)th line and FIG. 4(C)-(d) on the (j+2) line. As is indicated in FIG. 4(C)-(b) to 4(B)-(d), the gate voltage pulse is sequentially applied to the gate electrodes for sequentially scanning the gate electrodes. FIG. 4(C)-(e) through 4(C)-(g) depict waveform of the common voltage applied to the common electrode on the (j)th through (j+2)th lines, wherein the common electrodes $V_{cj}$, $V_{cj+1}$ and $V_{cj+2}$ are supplied to the common electrodes on the same line as the gate electrodes being scanned, during the even frames.

From the foregoing, it is clear that during the odd frames the source voltage on the (i)th column and the gate voltage on the (j)th line are supplied to turn on the TFT at the intersection (i, j) so that the liquid crystal material at the specific picture element (i, j) is supplied with the source voltage and hence the voltage $V_{LCij}$. This results in writing the specific picture element (i, j).

Since, during the next succeeding line scanning the source voltage on the (i)th column is zero during the odd interval, the TFT at the intersection (i, j+1) is in the off state and the voltage $V_{LCij+1}$ across the (i, j+1) picture element is also zero.

The same procedure will be repeated during the second succeeding (j+2) line without performing the write operation. The procedure continues up to the last line to complete one frame scanning.

During the next succeeding frame, that is, the even frame the operation of the TFTs is reversed. This is because the source voltage is supplied in association with voltage supply to the gate electrode in such a way that the TFT (i, j) is off and the (i, j+1) is on and the TFT (i, j+2) is on. With respect to the picture element of which the associated TFT is off, the voltage is supplied from the common electrode so that the liquid crystal material is supplied with the voltage in the direction opposite to that during the odd frame scanning (see FIG. 4(C)-(h)). For the picture element with the TFT in the on state, the liquid crystal material is supplied with the source voltage $V_{si}$ and the common voltages $V_{CJ+1}$ and $V_{CJ+2}$ at the same time. Since these voltages are identical in polarity, waveform and magnitude, no voltage is therefore applied as best seen from FIG. 4(C)-(i) and 4(C)-(j). The above mentioned embodiment makes it possible to achieve the purposes.

While in accordance with the teachings of the present invention, one common electrode is required opposing each digit of segments rendering the manufacture of the liquid crystal panel and the driving circuit somewhat complicated, it is possible to use the TFTs even with poor $R_{OFF}/R_{ON}$ characteristics and still perform an ideal enabling operation as long as there is no difference in operating performances from one TFT to another. The findings of the inventor's experiments indicated that a 128 digit display bears as high contrast as in a conventional static mode through the use of elements with $R_{OFF}/R_{ON} \approx 300$.

The elements of which the ratio of the off resistance to the on resistance is approximately 300 are available thanks to the present invention when implemented the enabling circuit of the present invention. Te can be therefore used as semiconductor material and CdS, CdSe, PbS, etc. can be also used.

Figure 4E:
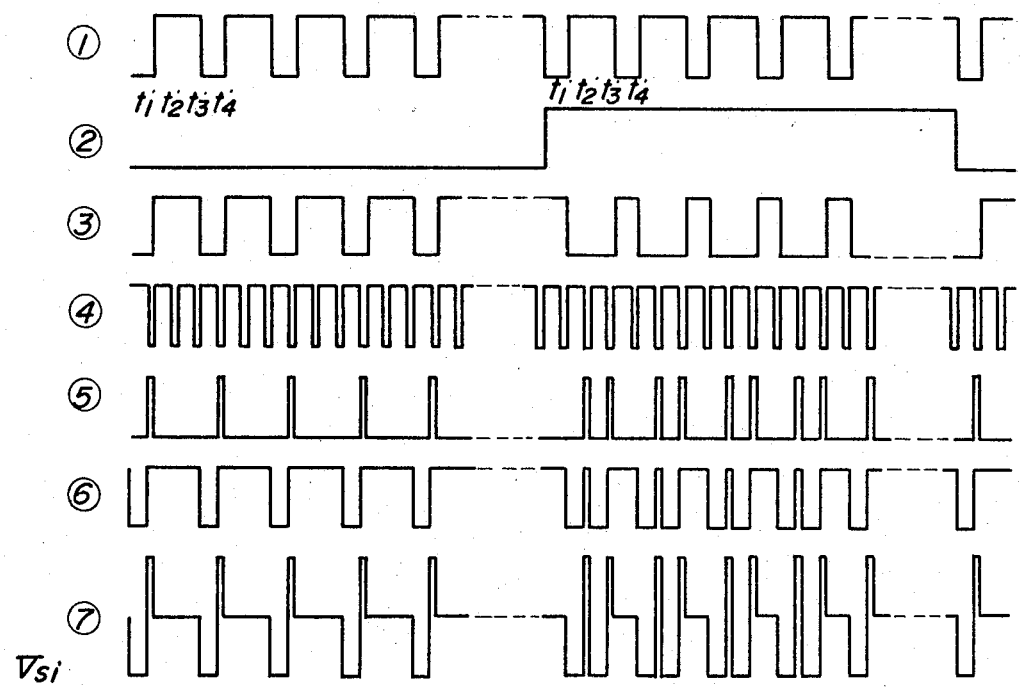
Figure 4D:
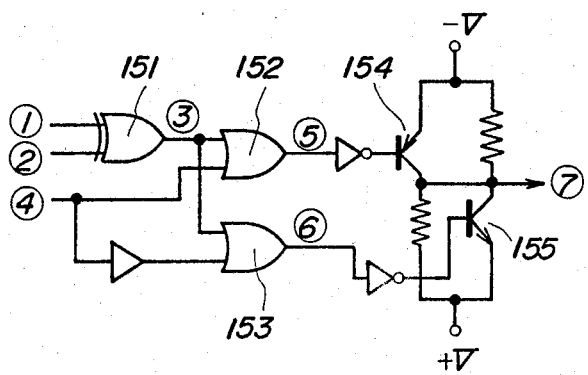
Figure 4:
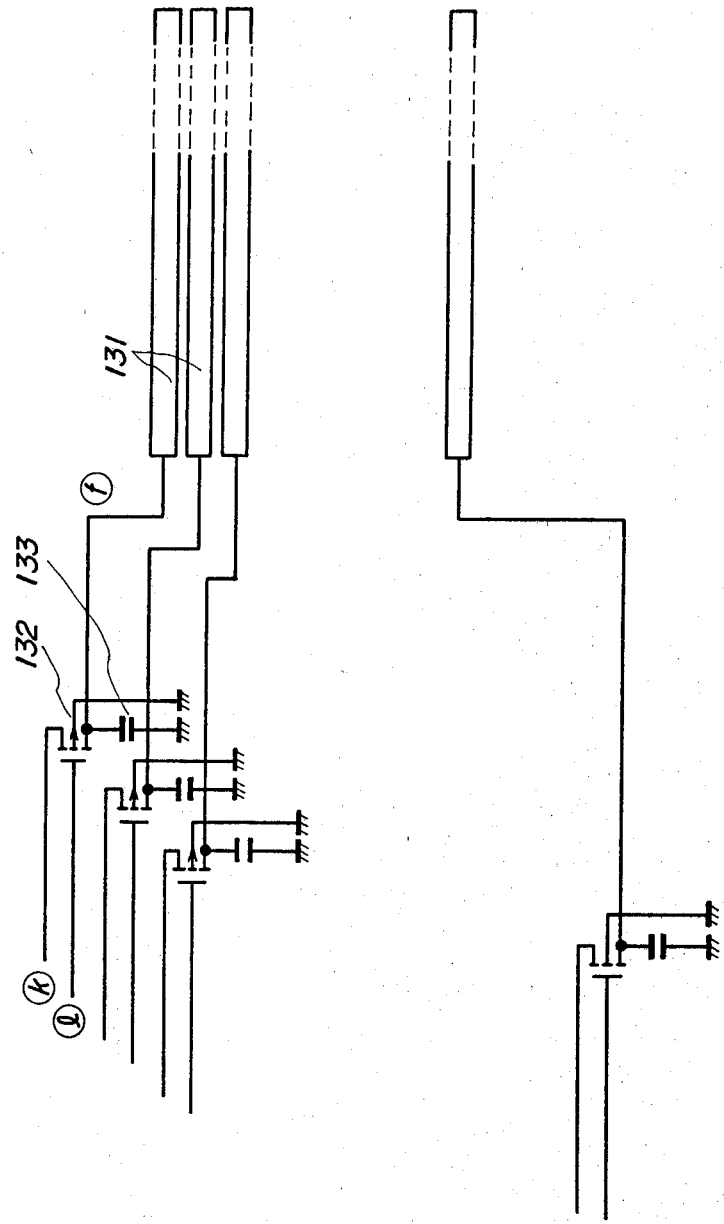
Figure 4G:
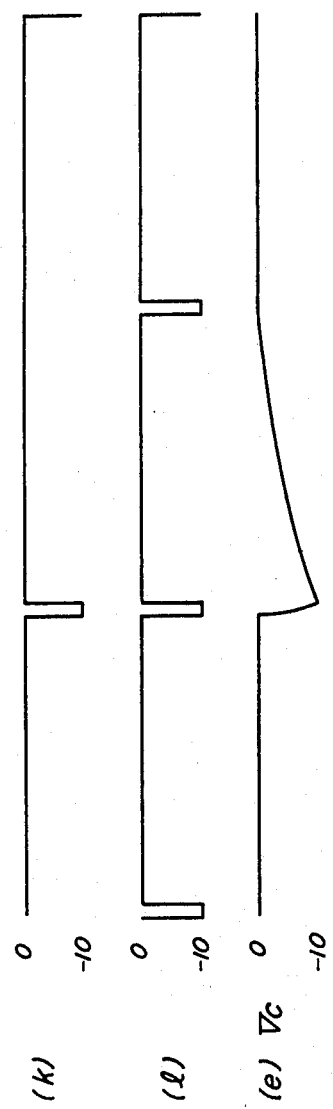

FIGS. 4(D) and 4(E) show a concrete circuit for producing the source voltage $V_{si}$ which is to be supplied to the source electrode of the TFT. This includes generally an exclusive OR logic circuit 151, a pair of OR logic circuits 152, 153 and a pair of bipolar transistors 154, 155. Operation of the circuit is obvious to those skilled in the art from reference to FIG. 4(E). In FIGS. 4(F) and 4(G), there is illustrated an example of a circuit adapted to generate the common voltages $V_{cj}-V_{cj+2}$, which includes a P-channel MOS FET 132 and a capacitor 133.

The shape of the segmented display electrodes is not limited to the above described minus-in-square configuration. Alpha-numeric, cross-in-square configuration, or the like can also be adopted.

Attention is directed to a specific construction of the segmented type liquid crystal display in accordance with the present invention.

Firstly, the conventional construction of TFTs adapted for controlling the segmented type liquid crystal display will now be discussed briefly. FIGS. 5 to 8 indicate various types of the TFTs. In FIGS. 5 to 8, there are represented a substrate 41, a gate electrode 42, an insulating layer 43, a semiconductor layer 44, a source electrode 45, and a drain electrode 46.

Preferably, the substrate 41 is made of glass or the like. The material of the gate electrode 42 is selected from Al, Au, Ta, In or the like. The gate electrode 42 is deposited by evaporation or photo etching. The selected material of the insulating layer 43 may be $Al_2O_3$, $SiO_2$, SiO, $CaF_2$ or the like.

The insulating layer 43 is formed by evaporation, spattering or CVD. When the gate electrode 42 is made of Al, Ta or the like, insulating layer 43 can be formed by anodic oxidation of Al, Ta or the like.

The material of the semiconductor layer 44 is elected to be CdSe, CdS, Te or the like. The semiconductor layer 44 is deposited by evaporation or spattering.

The materials of the source electrode 45 and the drain electrode 46 are such that they have an ohmic contact with the semiconductor layer 44. As is obvious in the art, Au and Al are applicable to this purpose.

Figure 5:
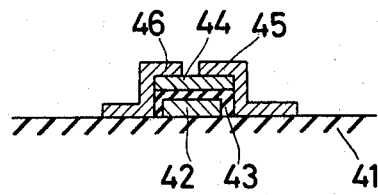
FIGS. 5 to 8 indicate cross-sectional views of a thin film transistor (TFT) for use with the present invention.

In FIG. 5, the insulating layer 43 covers the gate electrode 42 formed on the substrate 41. On the insulating layer 43, the semiconductor layer 44 is formed on which the source electrode 45 and the drain electrode 46 are deposited.

Figure 6:
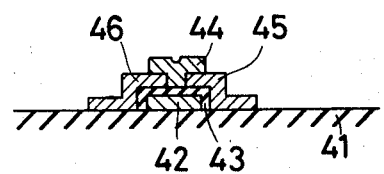
Figure 7:
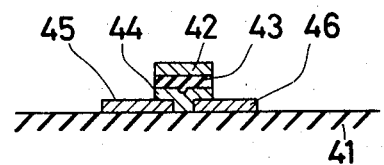
Figure 8:
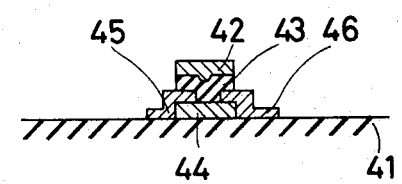

In FIG. 6, on the source electrode 45 and the drain electrode 46, the semiconductor layer 44 is disposed. In FIG. 7, on the substrate 41, the source electrode 45 and the drain electrode 46 are disposed. On and between the source electrode 45 and the drain electrode 46, the semiconductor layer 44 is positioned. On the semiconductor layer 44, the insulating layer 43 and the gate electrode 42 are provided. In FIG. 8, the semiconductor layer 44 is disposed on the substrate 41. Parts of the source electrode 45 and the drain electrode 46 are formed on the semiconductor layer 44. On the electrodes 45 and 46, the insulating layer 43 and the gate electrode 42 are formed.

Figure 9:
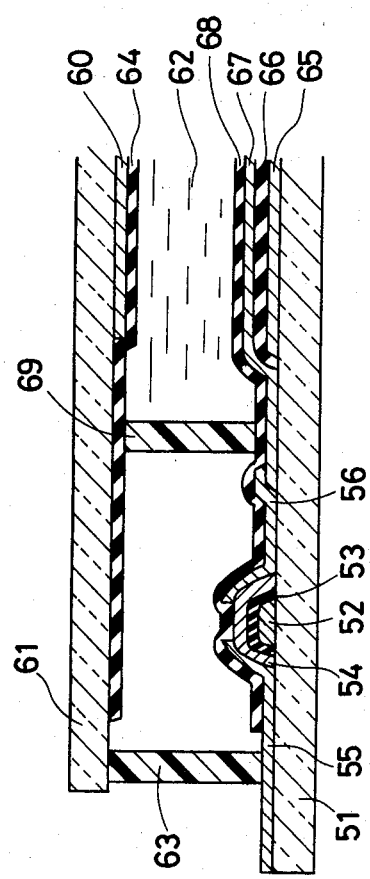
FIG. 9 shows a partial cross-sectional view of another form of the segmented type liquid crystal display according to the present invention.
Figure 10:
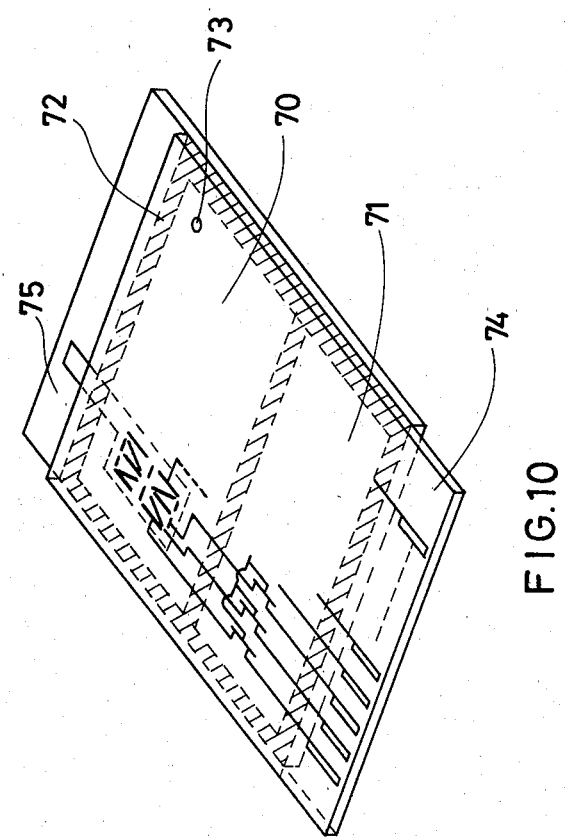
FIG. 10 shows a perspective view of the display indicated in FIG. 9.

FIGS. 9 and 10 show a specific segmented type liquid crystal display according to the present invention. A purpose of this portion of the present invention is to provide a sealing element between the region of TFTs and the segments for isolating the TFTs from the liquid crystal material in contact with the segments, so that TFTs are protected from the liquid crystal material. If TFTs are continuously in contact with the liquid crystal material, the properties of TFTs are damaged.

With reference to FIGS. 9 and 10, there are indicated substrates 51 and 61, a gate electrode 52, an insulating layer 53, a semiconductor layer 54, a source electrode 55, a drain electrode 56, a transparent conductive film 65, an insulating film 66, another transparent conductive film 67, another insulating film 68, a further transparent conductive film 60, a further insulating film 64, a sealing material 63, and a sealing element 69, and the liquid crystal layer 62.

For the purpose of forming a plurality of segments, the parasitic capacitor Cs, the transparent conductive film 65, the insulating film 66, and the another transparent conductive film 67 are disposed on the substrate 51. The insulating film 66 is composed of $SiO_2$, $Al_2O_3$ or the like by evaporation, spattering, or CVD.

The TFT comprises the gate electrode 52, the insulating layer 53, the semiconductor layer 54, the source electrode 55, and the drain electrode 56. The thickness of each of these films is that the gate 52 is about 500–5,000 Å, the layer 53 is about 100–1,500 Å, the layer 54 is about 50–500 Å, the source 55 and the drain 56 are about 250–5,000 Å, and the distance between the source 55 and the drain 56 is about 1–100 $\mu$m.

The transparent conductive film 67 positioned in the segment portion is connected to the drain electrode 56 of one of TFTs. The insulating film 68 is provided for orienting liquid crystal molecules. The insulating film 68 is composed of SiO, $SiO_2$, $Al_2O_3$, $Si_3N_4$ or the like. The transparent conductive film 60 and the insulating film 64 are disposed on the substrate 61. The conductive film 60 acts as a counter electrode against the segments.

The sealing material 63 and the sealing element 69 are provided by screen printing. They serve to bond the substrates 51 and 61 with each other. After they are hardened, the liquid crystal material 62 is introduced only into a cavity having the display segments.

According to this configuration, as viewed from FIG. 10, a TFT array portion 71 is separated from a display portion 70 such that the liquid crystal material 62 does not enter the TFT array portion 71. A cavity of the TFT array portion 71 is filled with an inert gas such as Ar, $N_2$ or the like. Therefore, properties of TFTs in this cavity are not damaged due to moisture contained within the atmosphere.

It is preferable that $R_{off}/R_{on} \geq$ about 100 in the case where the TFTs is applied to drive the liquid crystal display. This limitation is maintained by the condition that TFT is not in contact with the liquid crystal material.

In FIG. 10, 72 denotes the sealing material 63, 73 designates an injection hole used for injecting the liquid crystal material, 74 designates a terminal portion to which segmented display electrodes are exposed, and 75 indicates another terminal portion to which the counter electrode is exposed.

A further attention is directed to a further preferred embodiment of the present invention. FIG. 11 indicates a further specified segmented type liquid crystal display according to the present invention. This embodiment is to reduce the degree of integration of TFTs and the parasitic capacitors Cs on the same substrate and to optimize the arrangement of TFTs on the substrate. In addition, another purpose of this embodiment is to reduce the number of connection terminals provided for communicating the segmented display electrodes and the counter electrode with an external circuit means with the result that the connection terminals are easily connected to appropriate terminals.

Figure 11A:
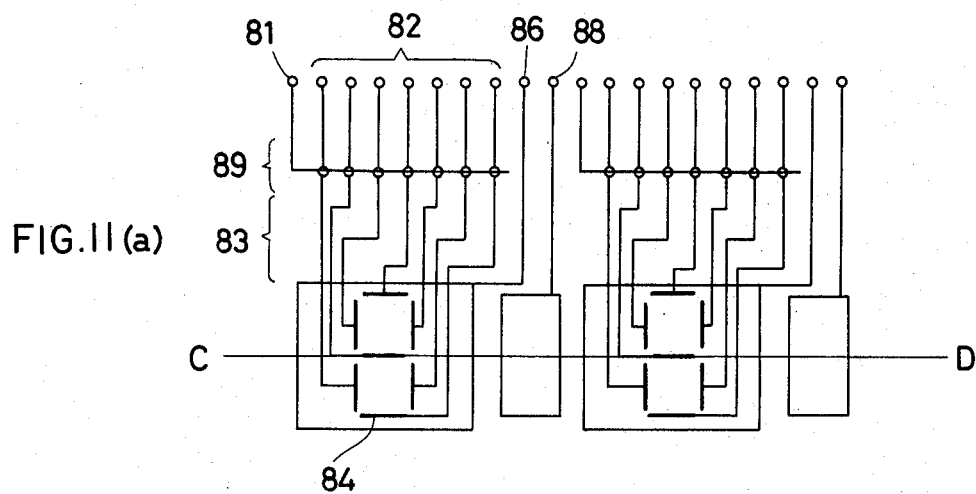
FIGS. 11(a) and 11(b) show electrode configurations adapted for a further form of the segmented type liquid crystal display according to the present invention.
Figure 11B:
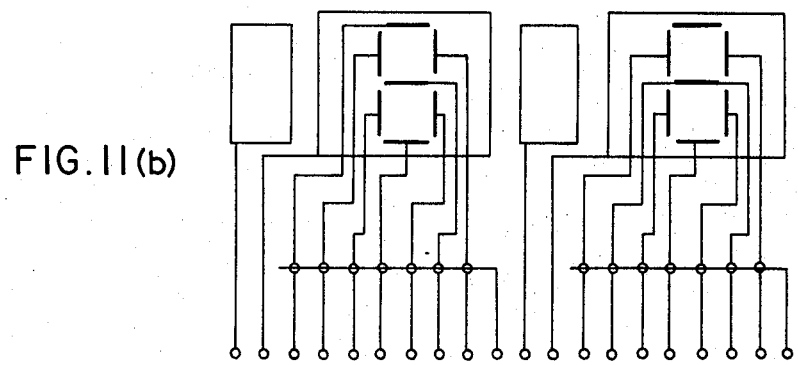
Figure 11C:
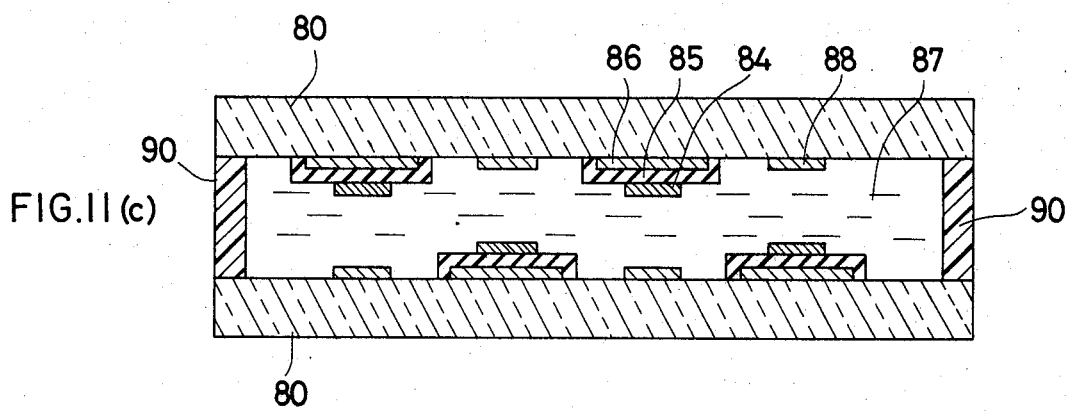
FIG. 11(c) indicates a sectional view taken along the line C-D of FIG. 11(a), representing the segmented type liquid crystal display cell.

FIGS. 11(a) and 11(b) indicate an electrode configuration on a further preferred form of the segmented type liquid crystal display in accordance with the present invention. The electrode pattern of FIG. 11(a) is formed on one of a pair of substrates while that of FIG. 11(b) is formed on the other. FIG. 11(c) indicates a sectional view taken along the line C-D of FIG. 11(a), representing the segmented type liquid crystal display cell. Indication of protecting films adapted for the segmented type liquid crystal cell is omitted in these drawings for the sake of description.

In FIGS. 11(a) to 11(c), 80 indicates a substrate, 81 designates a gate electrode, 82 designates a group of source electrodes, 83 designates a group of drain electrodes, 84 represents a segmented display electrode and one of a pair of electrodes of the parasitic capacitor Cs, 86 represents the other of the pair of electrodes of Cs, 85 represents an insulating layer, 87 represents a liquid crystal layer, 88 represents a counter electrode, 89 is an array of TFTs, and 90 is a sealing material.

As is seen from these drawings, TFTs and the parasitic capacitors Cs are allotted equally to the two substrates 80. Therefore, the degree of integration of TFTs and the parasitic capacitors Cs is reduced to half as compared to the conventional case in which one substrate has TFTs and the parasitic capacitors and the other has only the counter electrode. Since all the terminals connected to the segmented display electrodes are not provided on the same substrate 80 according to this arrangement, the degree of integration of the terminals is reduced as such.

The degree of density of display elements and the terminals is reduced so that the display cell can be easily manufactured and high productivity is obtained.

Figure 12A:
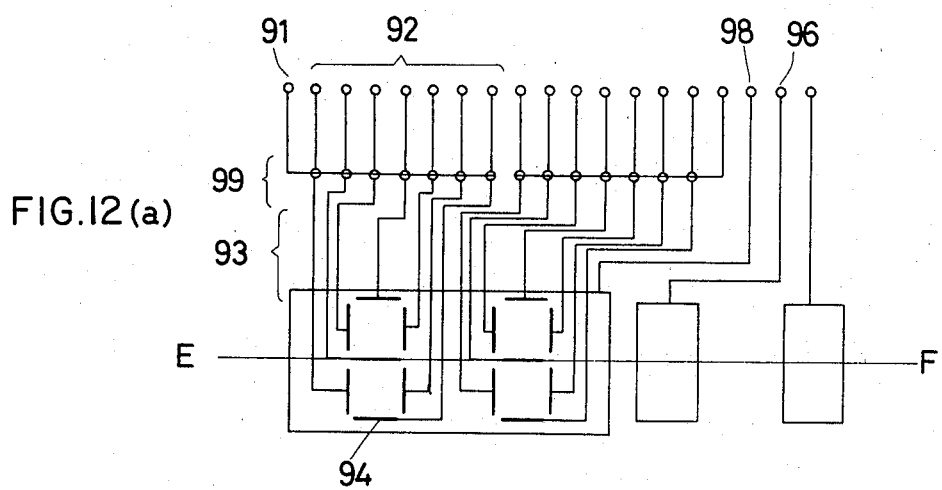
FIGS. 12(a) and 12(b) show other electrode configurations adapted for a still further form of the segmented type liquid crystal display according to the present invention.
Figure 12B:
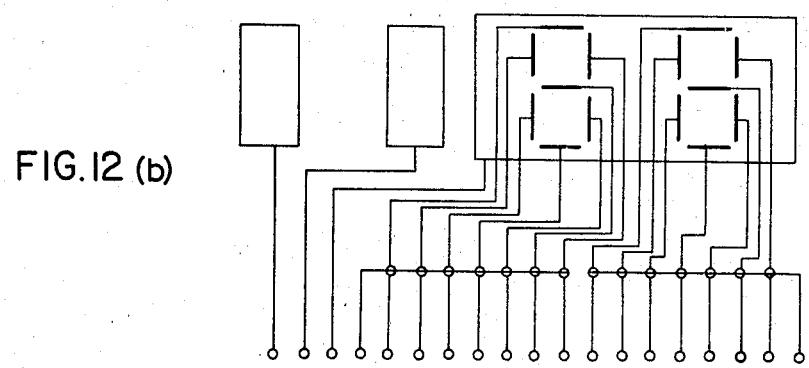
Figure 12C:
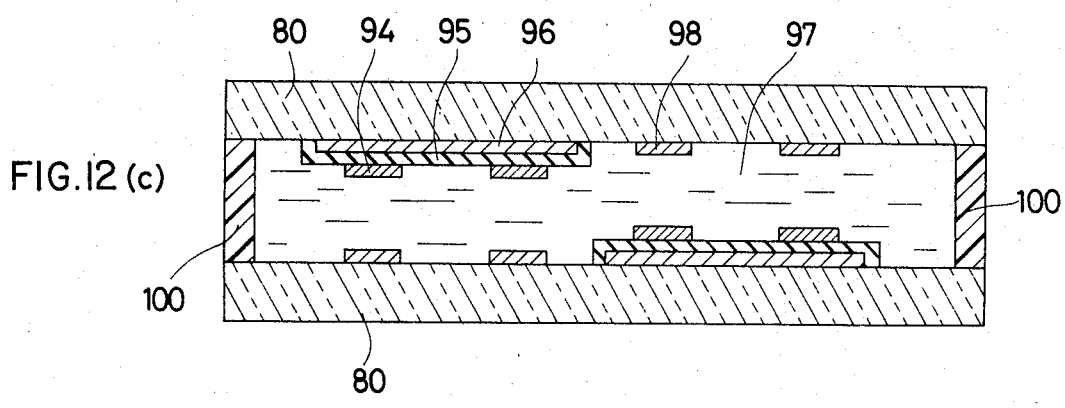
FIG. 12(c) indicates a sectional view taken along the line E-F of FIG. 12(a), representing the segmented type liquid crystal display.

FIGS. 12(a), (b), (c) show a further specified segmented type liquid crystal display. FIGS. 12(a) and 12(b) show an electrode configuration of the liquid crystal display formed on a different substrate so as to confront each other. FIG. 12(c) indicates a sectional view taken along the line E-F of FIG. 12(a).

This example is featured in that the display segments and the counter electrodes are gathered on the respective substrates. This example provides the results described in connection with FIGS. 11(a) to 11(c).

In FIGS. 12(a) to 12(c), 91 represents a gate electrode, 92 represents a group of source electrodes, 93 represents a group of drain electrodes, 94 represents a segmented display electrode and one of a pair of electrodes of the parasitic capacitors Cs, 95 represents an insulating film, 96 represents the other of the pair of electrodes of Cs, 97 represents a liquid crystal layer, 98 represents a counter electrode, 99 is an array of TFTs, 100 is a sealing element, and 80 is a substrate.

Figure 13:
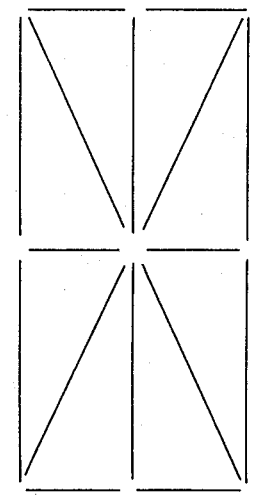
FIG. 13 shows a segmented pattern used for providing an indication of an alphanumeric form.

The shape of the segmented display electrodes should not be limited to the above-described minus-in-square configuration. Alphanumeric configuration as shown in FIG. 13, cross-in-square configuration, or the like can be adopted. Since the degree of integration of TFTs and the parasitic capacitors Cs is increased in these configurations more than in the minus-in-square shape, the present invention becomes meaningful the more. It should be noted that in the example of the present invention, switching circuit means for TFTs and the parasitic capacitors Cs is also allotted to a different substrate, too.

While only certain embodiments of the present invention have been described, it will be apparent to those skilled in the art that various changes and modifications may be made therein without departing from the spirit and scope of the invention as claimed.

What is claimed is:

1. A system for driving a segmented type display device comprising:
    a thin film transistor (TFT) array including a plurality of TFTs each having a gate line, a source line, and a drain line;

a pair of substrates, a first one of which carries said thin film transistor array;

segmented display electrode means connected to said plurality of TFTs for providing a visual display;

common electrode means for cooperating with said segmented display electrode means to produce the visual display;

a second of said pair of substrates carrying said common electrode means;

a liquid crystal material interposed between said pair of substrates; and source line driving means for driving said source line with a first voltage waveform having positive and negative pulses;

wherein the ratio of the pulse width of said positive pulses to the pulse width of said negative pulses is selected so that charging and discharging voltages produce a net zero voltage applied to each TFT when that TFT is off.

2. The system as set forth in claim 1, further comprising:

means for sequentially scanning said segmented type display panel, said scanning means supplying said common electrode means with a voltage waveform different during odd scanning frames and during even ones, the waveform seen at said drain line to application of said first voltage waveform to said source line having a phase 180° out of phase with the voltage applied to said common electrode means corresponding to a specific segmented display electrode means of the panel to be written, thereby supplying an alternating voltage to said liquid crystal material.

3. A system for driving a segmented type display device comprising:

a thin film transistor (TFT) array including a plurality of TFTs each having a gate line, a source line, and a drain line;

a pair of substrates a first one of which carries said thin film transistor array;

segmented display electrode means connected to said plurality TFTs for providing a visual display;

common electrode means for cooperating with said segmented display electrodes to produce the visual display;

a second of said pair of substrates carrying said common electrode means;

a liquid crystal material interposed between said pair of substrates;

means for sequentially scanning said segmented type display panel, said scanning means comprising:

means for supplying said common electrode means with a voltage waveform only during even scanning frames; and gate means for sequentially addressing said TFTs with gate pulses;

means for supplying said source line with a waveform having a plurality of pairs of positive and negative pulses during said odd scanning frames and for supplying said source line with a plurality of pairs of negative and positive pulses during said even scanning frames, said negative and positive pulses being arranged in said even frames so as to correspond in time with the gate pulses of TFTs corresponding to uncolored segmented display electrodes in said even frames and said positive and negative pulses being arranged in time with the gate pulses of TFTs corresponding to colored segments during said odd frames;

said means for supplying said common electrode means producing a voltage across each said display segment equal to said voltage across said uncolored display segments produced in said even frames.

4. The system as set forth in claim 1, 2, or 3, wherein the distance between said source electrode and said drain electrode of one of said TFTs is greater than or equal to 100 μm.

5. The system as set forth in claim 1, 2, or 3, further comprising a plurality of capacitors each connected to said segmented display electrode means.

* * * * *